United States Patent
Liu et al.

(10) Patent No.: US 10,562,106 B2
(45) Date of Patent: Feb. 18, 2020

(54) FIXTURE FOR IMPROVING BALANCE PRECISION OF WHEEL

(71) Applicant: CITIC DICASTAL CO., LTD, Qinhuangdao, Hebei (CN)

(72) Inventors: Weidong Liu, Hebei (CN); Xiaoyu Jiang, Hebei (CN); Fengyan Liu, Hebei (CN)

(73) Assignee: CITIC DICASTAL CO., LTD, Qinhuangdao, Hebei (CN)

( * ) Notice: Subject to any disclaimer, the term of this patent is extended or adjusted under 35 U.S.C. 154(b) by 0 days.

(21) Appl. No.: 16/052,893

(22) Filed: Aug. 2, 2018

(65) Prior Publication Data

US 2019/0224756 A1 Jul. 25, 2019

(30) Foreign Application Priority Data

Jan. 23, 2018 (CN) .......................... 2018 1 0063566

(51) Int. Cl.
*B23B 31/40* (2006.01)

(52) U.S. Cl.
CPC ...... *B23B 31/4053* (2013.01); *B23B 31/4046* (2013.01); *Y10T 279/1045* (2015.01)

(58) Field of Classification Search
CPC .............. B23B 31/404; B23B 31/4046; B23B 31/4053; B60C 25/0536; B60C 25/0539; Y10T 279/1045

See application file for complete search history.

(56) References Cited

U.S. PATENT DOCUMENTS

| 3,131,946 | A | * | 5/1964 | Newhouser | ......... | B23B 31/1261 |
| | | | | | | 279/2.03 |
| 4,875,693 | A | * | 10/1989 | Nowak | .................. | B23B 31/02 |
| | | | | | | 279/2.12 |
| 6,502,834 | B1 | * | 1/2003 | Fukui | .................... | B23B 31/201 |
| | | | | | | 279/156 |
| 6,612,791 | B1 | * | 9/2003 | Haimer | ................. | B23B 29/046 |
| | | | | | | 279/2.03 |
| 9,346,106 | B2 | * | 5/2016 | Ku | .......................... | B23B 31/42 |
| 2006/0055125 | A1 | * | 3/2006 | Ohnesorge | ............ | G01M 1/045 |
| | | | | | | 279/2.12 |
| 2019/0224792 | A1 | * | 7/2019 | Liu | ........................ | B21D 53/30 |

FOREIGN PATENT DOCUMENTS

GB 847682 A * 9/1960 ......... B23B 31/4046

* cited by examiner

*Primary Examiner* — Eric A. Gates
(74) *Attorney, Agent, or Firm* — Price Heneveld LLP

(57) ABSTRACT

The invention discloses a precision fixture for improving the balance precision of a wheel, comprising a chuck, a base, a servo motor, a lower pressure plate, a rubber strip, steel balls, an upper pressure plate, a mounting plate, a connecting shaft, a shaft sleeve, a hydraulic cylinder, a bearing end cover, bearings, a guard, an expanding core, expanding flaps, a flange plate, springs, pins, a flange, a connecting shaft and limiting columns. The fixture can meet the requirement for improving the balance precision of a wheel, at the same time, has the characteristics of simple structure, convenient manufacture, stable performance and precision that can meet the machining requirement, and can meet the requirements of automatic production.

3 Claims, 3 Drawing Sheets

FIXTURE FOR IMPROVING BALANCE PRECISION OF WHEEL

CROSS REFERENCE TO RELATED APPLICATION

This application claims priority to Chinese Patent Application No. 201810063566.7, entitled FIXTURE FOR IMPROVING BALANCE PRECISION OF WHEEL and filed on Jan. 23, 2018, which is incorporated herein by reference in its entirety and for all purposes.

FIELD OF THE INVENTION

The present invention relates to a machining device.

BACKGROUND OF THE INVENTION

In the wheel machining industry, wheel balance degree is an important factor affecting the comfort and the safety of an automobile and is a 100% test item. At the same time, the reject rate of wheel balance out of tolerance is an important factor affecting the wheel yield. By research and analysis, the wheel balance out of tolerance may be caused by many factors, wherein the outer rim machining traces formed in the first and second procedures of the wheel machining process are the key factor of balance out of tolerance. The present invention introduces a precision fixture for improving the balance precision of a wheel. The fixture not only can realize no machining trace on the outer rim of the wheel and improve the balance precision of the wheel, but also can improve the machining effect on the outer rim.

SUMMARY OF THE INVENTION

The aim of the present invention is to provide a precision fixture for improving the balance precision of a wheel.

In order to fulfill the above aim, the technical solution of the present invention is: a precision fixture for improving the balance precision of a wheel, comprising a chuck, a base, a servo motor, a lower pressure plate, a rubber strip, steel balls, an upper pressure plate, a mounting plate, a first connecting shaft, a shaft sleeve, a hydraulic cylinder, a bearing end cover, bearings, a guard, an expanding core, expanding flaps, a flange plate, springs, pins, a flange, a second connecting shaft and limiting columns.

The mounting plate, the bearing end cover and the flange are fixed on the base, the servo motor is mounted on the mounting plate, the shaft sleeve is mounted on the base through the two columns of bearings and the bearing end cover, the hydraulic cylinder is fixed inside the shaft sleeve, the output end of the hydraulic cylinder is connected with the second connecting shaft, the servo motor is connected with the shaft sleeve through the first connecting shaft, and the guard is fixed on the expanding core.

The expanding core is connected with the shaft sleeve through the second connecting shaft; the expanding core, the second connecting shaft and the shaft sleeve are locked circumferentially without relative rotation, and the second connecting shaft and the shaft sleeve can move axially relative to each other.

The flange plate is fixed on the flange, eight T-shaped chutes distributed uniformly are formed in the inner cavity of the flange and the flange plate, the bottom surfaces of the eight expanding flaps are T-shaped structures formed in one-to-one correspondence with the eight T-shaped chutes, and the expanding flaps can slide in the chutes smoothly with high precision.

The inner walls of the expanding flaps are 15° bevels, and two ends of the eight springs are respectively connected with the flange plate and the eight expanding flaps.

Two groups of 15° bevels distributed uniformly at intervals are formed on the lateral surface of the expanding core, the number of bevels in each group is 8, the two groups of bevels have a height difference therebetween, and the upper side walls of the two groups of bevels are intersected at a tapered surface; under the coaction of tension of the hydraulic cylinder and elasticity of the springs, when the expanding core is at the bottom, the side walls of the expanding flaps contact the tapered surface of the expanding core; the servo motor drives the expanding core to rotate 22.5° through the first connecting shaft, the shaft sleeve and the second connecting shaft; and the bevels matched with the expanding flaps can be switched between the two groups of bevels of the expanding core.

The hydraulic cylinder drives the second connecting shaft and the expansion core to move up and down, the eight expansion flaps move synchronously centripetally and centrifugally along the eight uniformly-distributed T-shaped chutes formed in the inner cavity of the flange and the flange plate through the fit of the expanding flaps and the bevels of the expanding core, and the eight expanding flaps realize high-precision synchronous expansion and contraction functions.

Since the two groups of bevels spaced uniformly on the lateral surface of the expanding core have a height difference, when the servo motor drives the expanding core to rotate 22.5°, the bevels matched with the expanding flaps are switched between the two groups of bevels of the expanding core, thus, the expansion and contraction diameters of the expanding flaps change in two different ranges, and eventually the expanding flaps achieve largestroke expansion and contraction.

The lower pressure plate is fixed on the base, the limiting columns and the upper pressure plate are mounted on the lower pressure plate, and the steel balls and the rubber strip are enclosed in a space formed by the lower pressure plate and the upper pressure plate. A first convex structure and a second convex structure are formed on the upper end face of the lower pressure plate, a third convex structure and a fourth convex structure are correspondingly formed on the lower end face of the upper pressure plate, the second convex structure on the outer side of the lower pressure plate and the fourth convex structure on the outer side of the upper pressure plate form a first jaw, and the first convex structure on the inner side of the lower pressure plate and the third convex structure on the inner side of the upper pressure plate form a second jaw.

The rubber strip is enclosed in a ring groove formed by the first jaw and the second jaw, and can move radially in the groove; three groups of steel balls are enclosed inside the second jaw and separated by the three limiting columns therebetween to avoid circumferential rotation of the steel balls during operation.

During operation, the wheel rotates at a high speed, the steel balls are thrown outward through centrifugal force, the steel balls drive the rubber strip to move out and to compress the inner rim of the wheel, and the rubber strip in the compressed state have strong elasticity and can effectively offset the vibration of the wheel rim during machining, thereby improving the machining effect of the wheel, realizing once forming of the outer rim of the wheel without machining traces and accordingly improving the balance precision of the wheel.

A bevel structure is formed on an outer portion of the upper end face of the lower pressure plate, and after the operation is completed, the steel balls roll inward under the action of selfweight and disengage from the rubber strip to facilitate removal of the wheel.

Corresponding pin holes are formed in the flange and the flange plate, and the pins are respectively connected with the pin holes of the flange and the flange plate to ensure the assembly precision of the flange and the flange plate.

Before actual use, the fit of the corresponding bevels of the expanding core and the expanding flaps is adjusted through the servo motor and the hydraulic cylinder according to the diameter of the center hole of the wheel. During actual use, when a wheel is placed on the fixture, the expanding flaps are placed in the center hole of the wheel, tiny gaps are reserved between the rubber strip and the inner rim of the wheel, then, the hydraulic cylinder drives the second connecting shaft and the expanding core to rise vertically, the eight expanding flaps are expanded with high precision through the fit of bevels of the expanding core and inner bevels of the expanding flaps and expand the center hole of the wheel, the bevel manufacturing precision of the expanding core and the expanding flaps is very high, the expansion consistency and precision of the expansion flaps are extremely high, and the wheel positioning operation is completed. Then, machining of the wheel begins, the wheel rotates at a high speed, the steel balls are thrown outward through the centrifugal force, and the steel balls drive the rubber strip to move out and to compress the inner rim of the wheel. The rubber strip in the compressed state has strong elasticity and can effectively offset the vibration of the wheel rim during machining, thereby improving the machining effect of the wheel, realizing once forming of the outer rim of the wheel without machining traces and accordingly achieving the aim of improving the balance precision of the wheel.

The fixture can meet the requirement for improving the balance precision of a wheel, at the same time, has the characteristics of simple structure, convenient manufacture, stable performance and precision that can meet the machining requirement, and can meet the requirements of automatic production.

Figure 1:
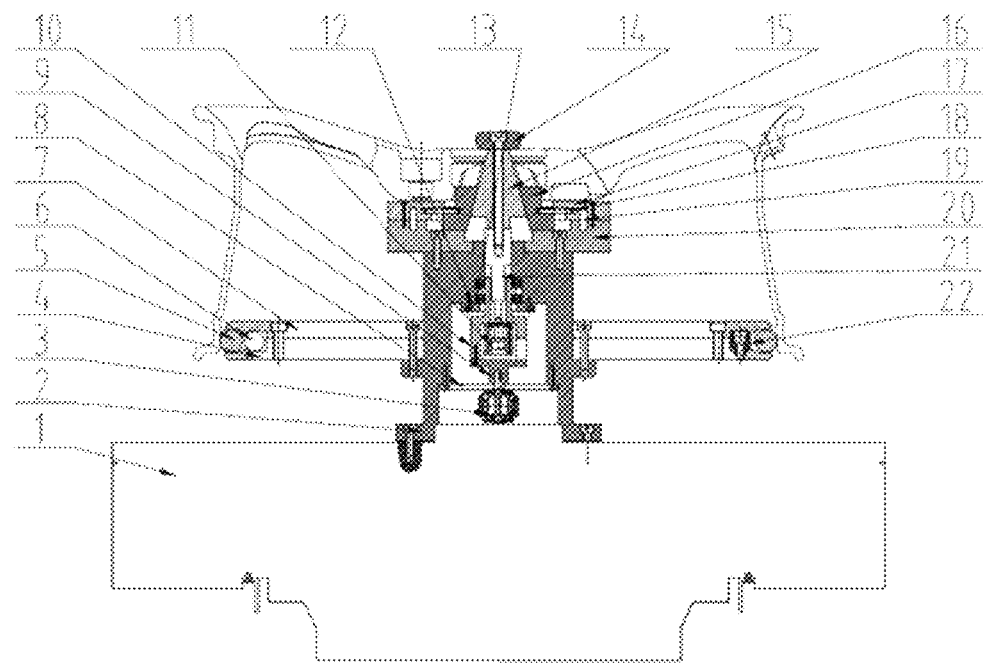
FIG. 1 is a cross-sectional side elevation view of a precision fixture for improving the balance precision of a wheel according to the present invention.
Figure 2:
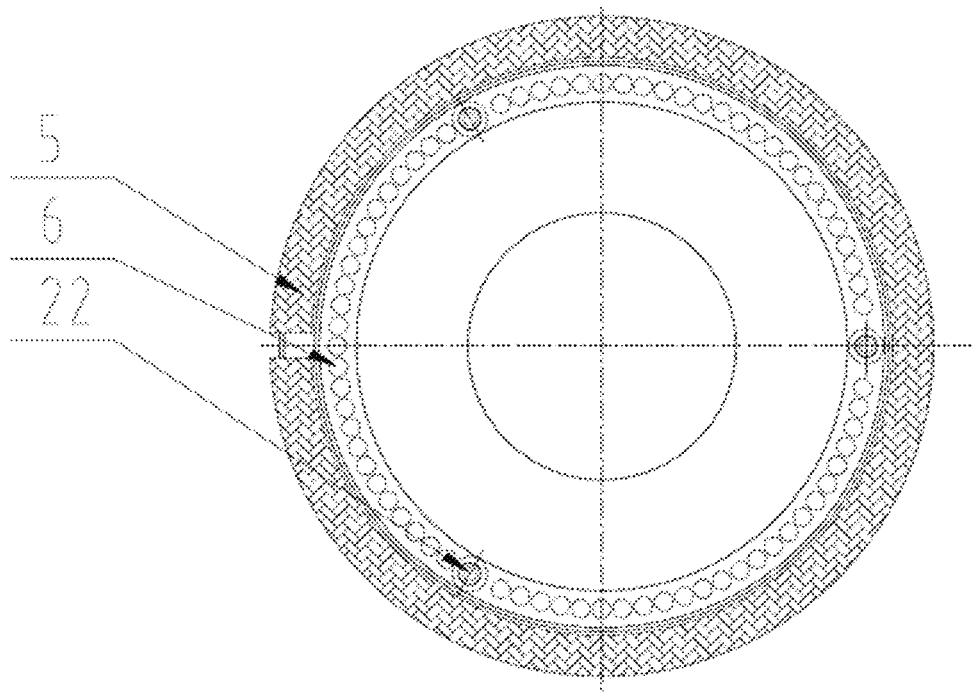
FIG. 2 is a top plan view or distribution diagram of a rubber strip, steel balls and limiting columns in the precision fixture for improving the balance precision of a wheel according to the present invention.
Figure 3:
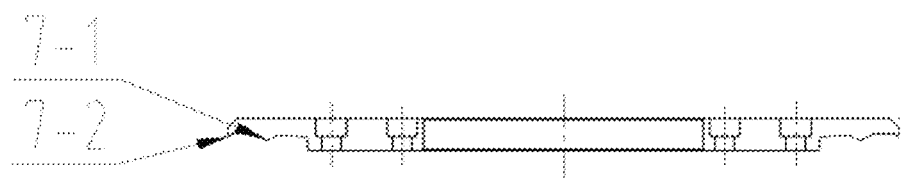
FIG. 3 is a cross-sectional side elevation view of an upper pressure plate in the precision fixture for improving the balance precision of a wheel according to the present invention.
Figure 4:
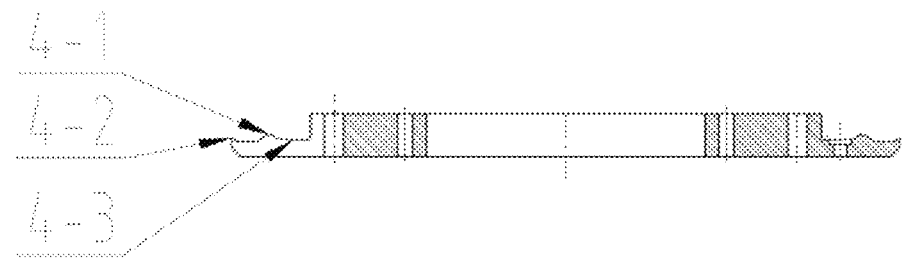
FIG. 4 is a cross-sectional side elevation view of a lower pressure plate in the precision fixture for improving the balance precision of a wheel according to the present invention.
Figure 5:
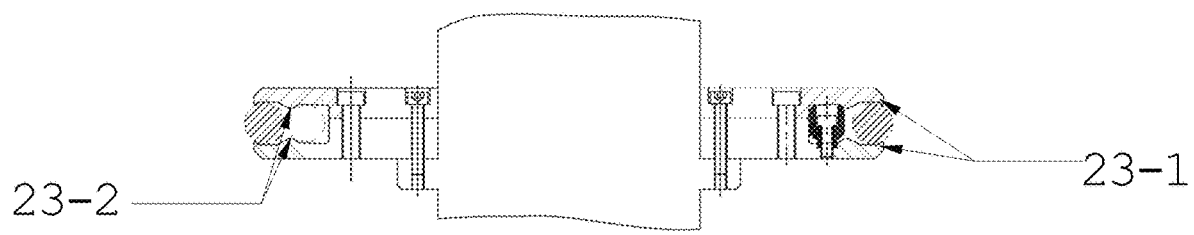
FIG. 5 is a cross-sectional side elevation view or functional diagram of a flexible supporting structure in the precision fixture for improving the balance precision of a wheel according to the present invention.
Figure 6:
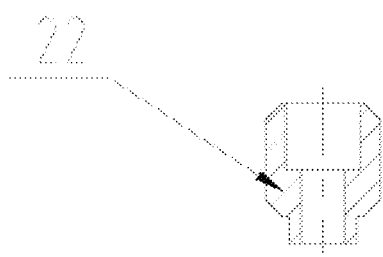
FIG. 6 is a cross-sectional side elevation view of a limiting column in the precision fixture for improving the balance precision of a wheel according to the present invention.
Figure 7:
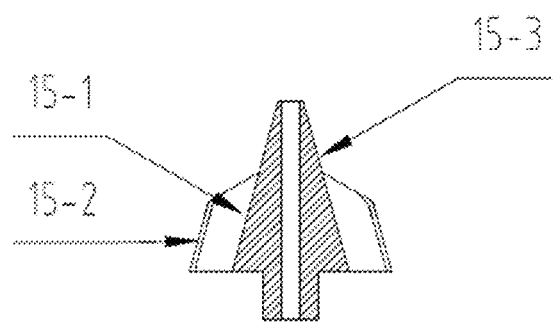
FIG. 7 is a cross-sectional side elevation view of an expanding core in the precision fixture for improving the balance precision of a wheel according to the present invention.

In which, 1—chuck, 2—base, 3—servo motor, 4—lower pressure plate, 5—rubber strip, 6—steel ball, 7—upper pressure plate, 8—mounting plate, 9—connecting shaft, 10—shaft sleeve, 11—hydraulic cylinder, 12—bearing end cover, 13—bearing, 14—guard, 15—expanding core, 16—expanding flap, 17—flange plate, 18—spring, 19—pin, 20—flange, 21—connecting shaft, 22—limiting column.

DETAILED DESCRIPTION OF THE EMBODIMENTS

The details and working conditions of the specific device according to the present invention will be described in detail below in combination with the drawings.

A precision fixture for improving the balance precision of a wheel according to the present invention comprises a chuck 1, a base 2, a servo motor 3, a lower pressure plate 4, a rubber strip 5, steel balls 6, an upper pressure plate 7, a mounting plate 8, a connecting shaft 9, a shaft sleeve 10, a hydraulic cylinder 11, a bearing end cover 12, bearings 13, a guard 14, an expanding core 15, expanding flaps 16, a flange plate 17, springs 18, pins 19, a flange 20, a connecting shaft 21 and limiting columns 22.

The mounting plate 8, the bearing end cover 12 and the flange 20 are fixed on the base 2, the servo motor 3 is mounted on the mounting plate 8, the shaft sleeve 10 is mounted on the base 2 through the two columns of bearings 13 and the bearing end cover 12, the hydraulic cylinder 11 is fixed inside the shaft sleeve 10, the output end of the hydraulic cylinder 11 is connected with the connecting shaft 21, the servo motor 3 is connected with the shaft sleeve 10 through the connecting shaft 9, and the guard 14 is fixed on the expanding core 15.

The expanding core 15 is connected with the shaft sleeve 10 through the connecting shaft 21; the expanding core 15, the connecting shaft 21 and the shaft sleeve 10 are locked circumferentially without relative rotation, and the connecting shaft 21 and the shaft sleeve 10 can move axially relative to each other.

The flange plate 17 is fixed on the flange 20, eight T-shaped chutes distributed uniformly are formed in the inner cavity of the flange 20 and the flange plate 17, the bottom surfaces of the eight expanding flaps 16 are T-shaped structures formed in one-to-one correspondence with the eight T-shaped chutes, and the expanding flaps 16 can slide in the chutes smoothly with high precision.

The inner walls of the expanding flaps 16 are 15° bevels, and two ends of the eight springs 18 are respectively connected with the flange plate 17 and the eight expanding flaps 16.

Two groups of 15° bevels 15-1 and 15-2 distributed uniformly at intervals are formed on the lateral surface of the expanding core 15, the number of bevels in each group is 8, the two groups of bevels have a height difference, and the upper side walls of the two groups of bevels are intersected at a tapered surface 15-3; under the coaction of tension of the hydraulic cylinder 11 and elasticity of the springs 18, when the expanding core 15 is at the bottom, the side walls of the expanding flaps 16 contact the tapered surface 15-3 of the expanding core 15; the servo motor 3 drives the expanding core 15 to rotate 22.5° through the connecting shaft 9, the shaft sleeve 10 and the connecting shaft 21; and the bevels matched with the expanding flaps 16 can be switched between the bevels 15-1 and the bevels 15-2 of the expanding core 15.

The hydraulic cylinder 11 drives the connecting shaft 21 and the expansion core 15 to move up and down, the eight expansion flaps 16 move synchronously centripetally and centrifugally along the eight uniformly-distributed T-shaped chutes formed in the inner cavity of the flange 20 and the flange plate 17 through the fit of the bevels of the expanding flaps 16 and the bevels of the expanding core 15, and the eight expanding flaps 16 realize high-precision synchronous expansion and contraction functions.

Since the two groups of bevels spaced uniformly on the lateral surface of the expanding core 15 have a height difference, when the servo motor 3 drives the expanding core 15 to rotate 22.5°, the bevels matched with the expanding flaps 16 are switched between the bevels 15-1 and the bevels 15-2 of the expanding core 15, thus, the expansion and contraction diameters of the expanding flaps 16 change in two different ranges, and eventually the expanding flaps 16 achieve large-stroke expansion and contraction.

The lower pressure plate 4 is fixed on the base 2, the limiting columns 22 and the upper pressure plate 7 are mounted on the lower pressure plate 4, and the steel balls 6 and the rubber strip 5 are enclosed in a space formed by the lower pressure plate 4 and the upper pressure plate 7. A first convex structure 4-1 and a second convex structure 4-2 are formed on the upper end face of the lower pressure plate 4, a third convex structure 7-1 and a fourth convex structure 7-2 are correspondingly formed on the lower end face of the upper pressure plate 7, the second convex structure 4-2 on the outer side of the lower pressure plate 4 and the fourth convex structure 7-2 on the outer side of the upper pressure plate 7 form a first jaw 23-1, and the first convex structure 4-1 on the inner side of the lower pressure plate 4 and the third convex structure 7-1 on the inner side of the upper pressure plate 7 form a second jaw 23-2.

The rubber strip 5 is enclosed in a ring groove formed by the first jaw 23-1 and the second jaw 23-2, and can move radially in the groove; three groups of steel balls 6 are enclosed inside the second jaw 23-2 and separated by the three limiting columns 22 therebetween to avoid circumferential rotation of the steel balls 6 during operation.

During operation, the wheel rotates at a high speed, the steel balls 6 are thrown outward through centrifugal force, the steel balls 6 drive the rubber strip 5 to move out and to compress the inner rim of the wheel, and the rubber strip 5 in the compressed state has strong elasticity and can effectively offset the vibration of the wheel rim during machining, thereby improving the machining effect of the wheel, realizing once forming of the outer rim of the wheel without machining traces and accordingly improving the balance precision of the wheel.

A bevel structure 4-3 is formed on an outer portion of the upper end face of the lower pressure plate 4, and after the operation is completed, the steel balls 6 roll inward under the action of self-weight and disengage from the rubber strip 5 to facilitate removal of the wheel.

Corresponding pin holes are formed in the flange 20 and the flange plate 17, and the pins 19 are respectively connected with the pin holes of the flange 20 and the flange plate 17 to ensure the assembly precision of the flange 20 and the flange plate 17.

Before actual use, the fit of the corresponding bevels of the expanding core 15 and the expanding flaps 16 is adjusted through the servo motor 3 and the hydraulic cylinder 11 according to the diameter of the center hole of the wheel. During actual use, when a wheel is placed on the fixture, the expanding flaps 16 are placed in the center hole of the wheel, tiny gaps are reserved between the rubber strip and the inner rim of the wheel, then, the hydraulic cylinder 11 drives the connecting shaft 21 and the expanding core 15 to rise vertically, the eight expanding flaps 16 are expanded with high precision through the fit of bevels of the expanding core 15 and the inner bevels of the expanding flaps 16 and expand the center hole of the wheel, the bevel manufacturing precision of the expanding core 15 and the expanding flaps 16 is very high, the expansion consistency and precision of the expansion flaps 16 are extremely high, and the wheel positioning operation is completed. Then, machining of the wheel begins, the wheel rotates at a high speed, the steel balls 6 are thrown outward through the centrifugal force, and the steel balls 6 drive the rubber strip 5 to move out and to compress the inner rim of the wheel. The rubber strip 5 in the compressed state has strong elasticity and can effectively offset the vibration of the wheel rim during machining, thereby improving the machining effect of the wheel, realizing once forming of the outer rim of the wheel without machining traces and accordingly achieving the aim of improving the balance precision of the wheel.

The invention claimed is:

1. A precision fixture for improving the balance precision of a wheel, comprising a chuck, a base, a servo motor, a lower pressure plate, a rubber strip, a plurality of steel balls, an upper pressure plate, a mounting plate, a first connecting shaft, a shaft sleeve, a hydraulic cylinder, a bearing end cover, a plurality of bearings, a guard, an expanding core, eight expanding flaps, a flange plate, eight springs, a plurality of pins, a flange, a second connecting shaft and a plurality of limiting columns, wherein the mounting plate, the bearing end cover and the flange are fixed on the base, the servo motor is mounted on the mounting plate, the shaft sleeve is mounted on the base through two columns of the plurality of bearings and the bearing end cover, the hydraulic cylinder is fixed inside the shaft sleeve, an output end of the hydraulic cylinder is connected with the second connecting shaft, the servo motor is connected with the shaft sleeve through the first connecting shaft, and the guard is fixed on the expanding core;

the expanding core is connected with the shaft sleeve through the second connecting shaft;

the expanding core, the second connecting shaft and the shaft sleeve are locked circumferentially without relative rotation, and the second connecting shaft and the shaft sleeve are configured to move axially relative to each other;

the flange plate is fixed on the flange, eight T-shaped chutes distributed uniformly are formed in an inner cavity of the flange and the flange plate, a bottom surface of each of the expanding flaps are T-shaped structures formed in one-to-one correspondence with the eight T-shaped chutes, and the expanding flaps are configured to slide in the T-shaped chutes smoothly with high precision;

inner walls of the expanding flaps are 15° bevels, and two ends of the springs are respectively connected with the flange plate and the expanding flaps;

two groups of 15° bevels are distributed uniformly at intervals are formed on a lateral surface of the expanding core, the number of bevels in each group is eight, the two groups of bevels have a height difference therebetween, and upper side walls of the two groups of bevels are intersected at a tapered surface; under the coaction of tension of the hydraulic cylinder and elasticity of the springs, when the expanding core is at the bottom, side walls of the expanding flaps contact the tapered surface of the expanding core; the servo motor drives the expanding core to rotate 22.5° through the first connecting shaft, the shaft sleeve and the second connecting shaft; bevels matched with the expanding flaps are configured to be switched between the two groups of bevels of the expanding core;

the hydraulic cylinder drives the second connecting shaft and the expanding core to move up and down, and the eight expanding flaps move synchronously centripetally and centrifugally in the eight uniformly-distributed T-shaped chutes formed along the inner cavity of the flange and the flange plate through a fit of the bevels of the expansion flaps and the bevels of the expansion core;

the lower pressure plate is fixed on the base, the limiting columns and the upper pressure plate are mounted on the lower pressure plate, and the steel balls and the rubber strip are enclosed in a space formed by the lower pressure plate and the upper pressure plate;

a first convex structure and a second convex structure are formed on an upper end face of the lower pressure plate, a third convex structure and a fourth convex structure respectively corresponding to the first convex structure and the second convex structure are formed on a lower end face of the upper pressure plate, the second convex structure on an outer side of the lower pressure plate and the fourth convex structure on an outer side of the upper pressure plate form a first jaw, and the first convex structure on an inner side of the lower pressure plate and the third convex structure on an inner side of the upper pressure plate form a second jaw;

the rubber strip is enclosed in a ring groove formed by the first jaw and the second jaw, and are configured to move radially in the groove; and three groups of steel balls are enclosed inside the second jaw and separated by three of the limiting columns therebetween to avoid circumferential rotation of the steel balls during operation.

2. The precision fixture for improving the balance precision of the wheel according to claim 1, wherein a bevel structure is formed on an outer portion of the upper end face of the lower pressure plate, and after the operation is completed, the steel balls roll inward under an action of self-weight and disengage from the rubber strip to facilitate removal of the wheel.

3. The precision fixture for improving the balance precision of the wheel according to claim 1, wherein corresponding pin holes are formed in the flange and the flange plate, and the pins are respectively connected with the pin holes of the flange and the flange plate to ensure an assembly precision of the flange and the flange plate.

* * * * *